United States Patent
Zhamu et al.

(10) Patent No.: US 10,483,542 B2
(45) Date of Patent: *Nov. 19, 2019

(54) ALUMINUM SECONDARY BATTERY HAVING AN EXFOLIATED GRAPHITE-BASED HIGH-CAPACITY CATHODE AND MANUFACTURING METHOD

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 163 days.

This patent is subject to a terminal disclaimer.

(21) Appl. No.: 15/434,913

(22) Filed: Feb. 16, 2017

(65) Prior Publication Data
US 2018/0233747 A1   Aug. 16, 2018

(51) Int. Cl.
| H01M 4/583 | (2010.01) |
| H01M 4/66 | (2006.01) |
| H01M 4/70 | (2006.01) |
| H01M 10/054 | (2010.01) |
| H01M 10/0585 | (2010.01) |
| H01M 4/02 | (2006.01) |

(52) U.S. Cl.
CPC .......... *H01M 4/583* (2013.01); *H01M 4/663* (2013.01); *H01M 4/70* (2013.01); *H01M 10/054* (2013.01); *H01M 10/0585* (2013.01); *H01M 2004/021* (2013.01)

(58) Field of Classification Search
CPC ........ H01M 4/583; H01M 4/663; H01M 4/70; H01M 2004/021; H01M 10/054; H01M 10/0585
See application file for complete search history.

(56) References Cited

U.S. PATENT DOCUMENTS

| 2,798,878 A | 7/1957 | Hummers |
| 4,139,474 A | 2/1979 | Watanabe et al. |
| 5,171,649 A | 12/1992 | Vaughn |
| 2005/0271574 A1 | 12/2005 | Jang et al. |

(Continued)

OTHER PUBLICATIONS

Rani, J. V., Kanakaiah, V., Dadmal, T., Rao, M. S. & Bhavanarushi, S. "Fluorinated natural graphite cathode for rechargeable ionic liquid based aluminum-ion battery," J. Electrochem. Soc. 160, A1781-A1784 (2013).

(Continued)

*Primary Examiner* — Brittany L Raymond

(57) ABSTRACT

Provided is an aluminum secondary battery comprising an anode, a cathode, and an electrolyte in ionic contact with the anode and the cathode to support reversible deposition and dissolution of aluminum at the anode, wherein the anode contains aluminum metal or an aluminum metal alloy as an anode active material and the cathode comprises a cathode active layer of an exfoliated graphite or carbon material having inter-flake pores from 2 nm to 10 μm in pore size (preferably from 2 nm to 20 nm, more preferably from 2 nm to 10 nm, and most preferably from 2 to 5 nm). Such an aluminum battery delivers a high energy density, high power density, and long cycle life.

21 Claims, 9 Drawing Sheets

(56) References Cited

U.S. PATENT DOCUMENTS

2014/0315100 A1\* 10/2014 Wang .................... H01M 4/366
                                                    429/319
2015/0249261 A1\* 9/2015 Dai ..................... H01M 10/054
                                                    429/336

OTHER PUBLICATIONS

Lin MC, Gong M, Lu B, Wu Y, Wang DY, Guan M, Angell M, Chen C, Yang J, Hwang BJ, Dai H., "An ultrafast rechargeable aluminum-ion battery," Nature. Apr. 16, 2015;520 (7547):325-8.
Jayaprakash, N., Das, S. K. & Archer, L. A. "The rechargeable aluminum-ion battery," Chem. Commun. 47, 12610-12612 (2011).
PCT/US18/16400 International Search Report and Written Opinion dated Apr. 19, 2018, 10 pages.

\* cited by examiner

ALUMINUM SECONDARY BATTERY HAVING AN EXFOLIATED GRAPHITE-BASED HIGH-CAPACITY CATHODE AND MANUFACTURING METHOD

FIELD OF THE INVENTION

The present invention relates generally to the field of rechargeable aluminum battery and, more particularly, to a high-capacity cathode layer containing a new group of exfoliated graphite or carbon materials and a method of manufacturing this cathode layer and the aluminum battery.

BACKGROUND OF THE INVENTION

Historically, today's most favorite rechargeable energy storage devices—lithium-ion batteries—was actually evolved from rechargeable "lithium metal batteries" that use lithium (Li) metal as the anode and a Li intercalation compound (e.g. $MoS_2$) as the cathode. Li metal is an ideal anode material due to its light weight (the lightest metal), high electronegativity (−3.04 V vs. the standard hydrogen electrode), and high theoretical capacity (3,860 mAh/g). Based on these outstanding properties, lithium metal batteries were proposed 40 years ago as an ideal system for high energy-density applications.

Due to some safety concerns of pure lithium metal, graphite was later implemented as an anode active material in place of the lithium metal to produce the current lithium-ion batteries.

The past two decades have witnessed a continuous improvement in Li-ion batteries in terms of energy density, rate capability, and safety. However, the use of graphite-based anodes in Li-ion batteries has several significant drawbacks: low specific capacity (theoretical capacity of 372 mAh/g as opposed to 3,860 mAh/g for Li metal), long Li intercalation time (e.g. low solid-state diffusion coefficients of Li in and out of graphite and inorganic oxide particles) requiring long recharge times (e.g. 7 hours for electric vehicle batteries), inability to deliver high pulse power, and necessity to use pre-lithiated cathodes (e.g. lithium cobalt oxide, as opposed to cobalt oxide), thereby limiting the choice of available cathode materials. Further, these commonly used cathode active materials have a relatively low lithium diffusion coefficient (typically $D\sim 10^{-16}$-$10^{-11}$ $cm^2/sec$). These factors have contributed to one major shortcoming of today's Li-ion batteries—a moderate energy density (typically 150-220 Wh/kg) but extremely low power density (typically <0.5 kW/kg).

Supercapacitors are being considered for electric vehicle (EV), renewable energy storage, and modern grid applications. The supercapacitors typically operate on using porous electrodes having large surface areas for the formation of diffuse double layer charges. This electric double layer capacitance (EDLC) is created naturally at the solid-electrolyte interface when voltage is imposed. This implies that the specific capacitance of an EDLC-type supercapacitor is directly proportional to the specific surface area of the electrode material, e.g. activated carbon. This surface area must be accessible by the electrolyte and the resulting interfacial zones must be sufficiently large to accommodate the EDLC charges.

This EDLC mechanism is based on ion adsorption on surfaces of an electrode. The required ions are pre-existing in a liquid electrolyte and do not come from the opposite electrode. In other words, the required ions to be deposited on the surface of a negative electrode (anode) active material (e.g., activated carbon particles) do not come from the positive electrode (cathode) side, and the required ions to be deposited on the surface of a cathode active material do not come from the anode side. When a supercapacitor is recharged, local positive ions are deposited close to a surface of a negative electrode with their matting negative ions staying close side by side (typically via local molecular or ionic polarization of charges). At the other electrode, negative ions are deposited close to a surface of this positive electrode with the matting positive ions staying close side by side. Again, there is no exchange of ions between an anode active material and a cathode active material.

In some supercapacitors, the stored energy is further augmented by pseudo-capacitance effects due to some local electrochemical reactions (e.g., redox). In such a pseudo-capacitor, the ions involved in a redox pair also pre-exist in the same electrode. Again, there is no exchange of ions between the anode and the cathode.

Since the formation of EDLC does not involve a chemical reaction or an exchange of ions between the two opposite electrodes, the charge or discharge process of an EDLC supercapacitor can be very fast, typically in seconds, resulting in a very high power density (typically 3-10 kW/Kg). Compared with batteries, supercapacitors offer a higher power density, require no maintenance, offer a much higher cycle-life, require a very simple charging circuit, and are generally much safer. Physical, rather than chemical, energy storage is the key reason for their safe operation and extraordinarily high cycle-life.

Despite the positive attributes of supercapacitors, there are several technological barriers to widespread implementation of supercapacitors for various industrial applications. For instance, supercapacitors possess very low energy densities when compared to batteries (e.g., 5-8 Wh/kg for commercial supercapacitors vs. 20-40 Wh/Kg for the lead acid battery and 50-100 Wh/kg for the NiMH battery). Modern lithium-ion batteries possess a much higher energy density, typically in the range of 150-220 Wh/kg, based on the cell weight.

Secondary batteries based on various charge-discharge principles other than lithium ions have been proposed. Among them, some attention has been paid to aluminum secondary batteries based on the deposition-dissolution reaction of aluminum (Al) at the anode. Aluminum has a high ionization tendency and is capable of three-electron redox reactions, which can potentially enable an aluminum battery to deliver a high capacity and high energy density.

The abundance, low cost, and low flammability of Al, and its ability to undergo three-electron redox imply that rechargeable Al-based batteries could in principle offer cost-effectiveness, high capacity and safety. However, the rechargeable Al batteries developed over the past 30 years have failed to make it to the marketplace. This has been likely due to problems such as cathode material disintegration, low cell discharge voltage (e.g. 0.55V), a capacitive behavior without a discharge voltage plateau (e.g. 1.1-0.2 V), and short cycle life (typically <100 cycles) with rapid capacity decay (by 26-85% over 100 cycles), low cathode specific capacity, and low cell-level energy density (<50 Wh/kg).

For instance, Jayaprakash reports an aluminum secondary battery that shows a discharge curve having a plateau at 0.55 V [Jayaprakash, N., Das, S. K. & Archer, L. A. "The rechargeable aluminum-ion battery," Chem. Commun. 47, 12610-12612 (2011)]. A rechargeable battery having an output voltage lower than 1.0 volt has a limited scope of application. As a point of reference, alkaline battery has an output voltage of 1.5 volts and a lithium-ion battery has a typical cell voltage of 3.2-3.8 volts. Furthermore, even with an initial cathode specific capacity as high as 305 mAh/g, the energy storage capability of the cathode is approximately 0.55 V×305 mAh/g=167.75 Wh/kg based on the cathode active material weight alone (not based on the total cell weight). Thus, the cell-level specific energy (or gravimetric energy density) of this Al—$V_2O_5$ cell is approximately 167.75/3.6=46.6 Wh/kg (based on the total cell weight).

(As a point of reference, a lithium-ion battery having a lithium iron phosphate (LFP) as the cathode active material (having a theoretical specific capacity of 170 mAh/g) delivers an output voltage of 3.2 volts and an energy storage capability of 3.2 V×170 mAh/g=544 Wh/kg (based on the LFP weight only). This cell is known to deliver a cell-level energy density of approximately 150 Wh/kg. There is a reduction factor of 544/150=3.6 to convert a cathode active material weight-based energy density value to a total cell weight-based energy density value in this battery system.)

As another example, Rani reports an aluminum secondary battery using a lightly fluorinated natural graphite as the cathode active material having an output voltage varying from 0.2 volts to 1.1 volts [Rani, J. V., Kanakaiah, V., Dadmal, T., Rao, M. S. & Bhavanarushi, S. "Fluorinated natural graphite cathode for rechargeable ionic liquid based aluminum-ion battery," J. Electrochem. Soc. 160, A1781-A1784 (2013)]. With an average voltage of approximately 0.65 volts and a discharge capacity of 225 mAh/g, the cell delivers an energy storage capability of 0.65×225=146.25 Wh/kg (of the cathode active material weight only) or cell-level specific energy of 146.25/3.6=40.6 Wh/kg (based on the total cell weight).

As yet another example, Lin, et al. reports an aluminum-graphite foam cell that exhibits a plateau voltage near 2 volts and an output voltage of 70 mAh/g [Lin M C, Gong M, Lu B, Wu Y, Wang D Y, Guan M, Angell M, Chen C, Yang J, Hwang B J, Dai H., "An ultrafast rechargeable aluminum-ion battery," Nature. 2015 Apr. 16; 520 (7547):325-8]. The cell-level specific energy is expected to be approximately 70×2.0/3.6=38.9 Wh/kg. As a matter of fact, Lin, et al. has confirmed that the specific energy of their cell is approximately 40 Wh/kg.

Clearly, an urgent need exists for new cathode materials that provide proper discharge voltage profiles (having a high average voltage and/or a high plateau voltage during discharge), high specific capacity at both high and low charge/discharge rates (not just at a low rate), and long cycle-life for an aluminum secondary battery. Hopefully, the resulting aluminum battery can deliver some positive attributes of a supercapacitor (e.g. long cycle life and high power density) and some positive features of a lithium-ion battery (e.g. moderate energy density). These are the main objectives of the instant invention.

SUMMARY OF THE INVENTION

The invention provides a cathode or positive electrode layer for an aluminum secondary battery (rechargeable aluminum battery or aluminum-ion battery) and an aluminum secondary battery containing such a cathode layer.

In some preferred embodiments, the invented aluminum secondary battery comprises an anode, a cathode, and an electrolyte in ionic contact with the anode and the cathode to support reversible deposition and dissolution of aluminum at the anode, wherein the anode contains aluminum metal or an aluminum metal alloy as an anode active material and the cathode comprises a cathode active layer of an exfoliated graphite or carbon material having inter-flake pores from 2 nm to 10 μm in pore size (preferably from 2 nm to 20 nm, more preferably from 2 nm to 10 nm, and most preferably from 2 to 5 nm). Such an aluminum battery delivers a high energy density, high power density, and long cycle life.

In certain embodiments, the exfoliated graphite or carbon material has a specific surface area from 100 to 3,000 $m^2/g$. Preferably, the specific surface area is greater than 500 $m^2/g$, more preferably greater than 1,000 $m^2/g$, further more preferably greater than 2,000 $m^2/g$, and most more preferably greater than 2,500 $m^2/g$.

Preferably, the electrolyte also supports reversible intercalation and de-intercalation of ions (cations, anions, or both) at the cathode. The aluminum alloy preferably contains at least 80% by weight Al element in the alloy (more preferably at least 90% by weight). There is no restriction on the type of alloying elements that can be chosen. Preferably, the alloying elements for Al are Si, B, Mg, Ti, Sc, etc.

This aluminum secondary battery can further comprise an anode current collector supporting the aluminum metal or aluminum metal alloy or further comprise a cathode current collector supporting the cathode active layer. The current collector can be a mat, paper, fabric, foil, or foam that is composed of conducting nano-filaments, such as graphene sheets, carbon nanotubes, carbon nano-fibers, carbon fibers, graphite nano-fibers, graphite fibers, carbonized polymer fibers, or a combination thereof, which form a 3D network of electron-conducting pathways. The high surface areas of such an anode current collector not only facilitate fast and uniform dissolution and deposition of aluminum ions, but also act to reduce the exchange current density and, thus, reduce the tendency to form metal dendrites that otherwise could cause internal shorting.

The exfoliated carbon or graphite material is preferably selected from a thermally exfoliated product of meso-phase pitch, meso-phase carbon, meso carbon micro-beads (MCMB), coke particles, expanded graphite flakes, artificial graphite particles, natural graphite particles, highly oriented pyrolytic graphite, soft carbon particles, hard carbon particles, multi-walled carbon nanotubes, carbon nano-fibers, carbon fibers, graphite nano-fibers, graphite fibers, carbonized polymer fibers, or a combination thereof.

The above-listed carbon/graphite material may be subjected to an inter-planar spacing expansion treatment, followed by a thermal exfoliation. The expansion treatment is conducted to increase the inter-planar spacing between two graphene planes in a graphite crystal, from a typical value of 0.335-0.36 nm to a typical value of 0.43-1.2 nm. This expansion treatment includes an oxidation, fluorination, bromination, chlorination, nitrogenation, intercalation, combined oxidation-intercalation, combined fluorination-intercalation, combined bromination-intercalation, combined chlorination-intercalation, or combined nitrogenation-intercalation of the graphite or carbon material. The above procedure is followed by a thermal exfoliation that can be conducted under a constrained thermal expansion condition. Alternatively, thermal exfoliation is allowed to proceed freely without constraint. Constrained thermal expansion can lead to exfoliated graphite or carbon that contains inter-flake pores 2-20 nm in pore size (preferably 2-10 nm and most preferably 2-5 nm). Free thermal exfoliation typically results in exfoliated graphite worms that have inter-flake pores having an average size from 20 nm to 50 μm (more typically from 100 nm to 10 μm).

Due to the expansion treatments, the carbon or graphite material can contain a non-carbon element selected from oxygen, fluorine, chlorine, bromine, iodine, nitrogen, hydrogen, or boron.

In the invented aluminum secondary battery, the electrolyte may be selected from an aqueous electrolyte, organic electrolyte, molten salt electrolyte, or ionic liquid electrolyte. A polymer may be added to the electrolyte. Preferably, the electrolyte contains an aluminum salt such as, $AlF_3$, $AlCl_3$, $AlBr_3$, $AlI_3$, $AlF_xCl_{(3-x)}$, $AlBr_xCl_{(3-x)}$, $AlI_xCl_{(3-x)}$, or a combination thereof, wherein x is from 0.01 to 2.0. Mixed aluminum halides, such as $AlF_xCl_{(3-x)}$, $AlBr_xCl_{(3-x)}$, $AlI_xCl_{(3-x)}$, can be readily produced by brominating, fluorinating, or iodizing $AlCl_3$ to a desired extent; for instance at 100-350° C. for 1-24 hours.

Preferably, the electrolyte contains an ionic liquid that contains an aluminum salt mixed with an organic chloride selected from n-butyl-pyridinium-chloride (BuPyCl), 1-methyl-3-ethylimidazolium-chloride (MEICl), 2-dimethyl-3-propylimidazolium-chloride, 1,4-dimethyl-1,2,4-triazolium chloride (DMTC), or a mixture thereof.

In certain embodiments, the layer of carbon or graphite material operates as a cathode current collector to collect electrons during a discharge of the aluminum secondary battery and wherein the battery contains no separate or additional cathode current collector.

The cathode active layer of graphite may further comprise an electrically conductive binder material which bonds particles or fibers of the carbon or graphite material together to form a cathode electrode layer. The electrically conductive binder material may be selected from coal tar pitch, petroleum pitch, meso-phase pitch, a conducting polymer, a polymeric carbon, or a derivative thereof.

Typically, the invented aluminum secondary battery has an average discharge voltage no less than 1 volt (typically and preferably >1.5 volts) and a cathode specific capacity greater than 200 mAh/g (preferably and more typically >300 mAh/g, and most preferably >400 mAh/g), based on a total cathode active layer weight.

Preferably, the aluminum secondary battery has an average discharge voltage no less than 2.0 volts and a cathode specific capacity greater than 100 mAh/g based on a total cathode active layer weight (preferably and more typically >300 mAh/g, and most preferably >400 mAh/g).

The present invention also provides a cathode active layer for an aluminum secondary battery. The cathode active layer comprises an exfoliated graphite or carbon material having inter-flake pores from 2 nm to 10 μm in pore size. Preferably, the exfoliated carbon or graphite material is a thermal exfoliation product of meso-phase pitch, meso-phase carbon, meso carbon micro-beads (MCMB), coke particles, expanded graphite flakes, artificial graphite particles, natural graphite particles, highly oriented pyrolytic graphite, soft carbon particles, hard carbon particles, multi-walled carbon nanotubes, carbon nano-fibers, carbon fibers, graphite nano-fibers, graphite fibers, carbonized polymer fibers, or a combination thereof, wherein the carbon or graphite material has an original inter-planar spacing $d_{002}$ from 0.27 nm to 0.42 nm prior to an expansion treatment and the inter-planar spacing $d_{002}$ is increased to a range from 0.43 nm to 1.2 nm after the expansion treatment and wherein the carbon or graphite material is subsequently thermally exfoliated to have inter-flake pores from 2 nm to 10 μm in pore size.

The present invention also provides a method of manufacturing an aluminum secondary battery. The methods comprises: (a) providing an anode containing aluminum or an aluminum alloy; (b) providing a cathode containing an exfoliated carbon or graphite material having inter-flake pores from 2.0 nm to 10 μm in size; and (c) providing an electrolyte capable of supporting reversible deposition and dissolution of aluminum at the anode and reversible adsorption/desorption and/or intercalation/de-intercalation of ions at the cathode. Preferably, the electrolyte contains an aqueous electrolyte, an organic electrolyte, a molten salt electrolyte, or an ionic liquid.

The method can further include providing a porous network of electrically conductive nano-filaments to support the aluminum or aluminum alloy at the anode.

In the method, the step of providing a cathode preferably contains subjecting a carbon or graphite material to an expansion treatment selected from an oxidation, fluorination, bromination, chlorination, nitrogenation, intercalation, combined oxidation-intercalation, combined fluorination-intercalation, combined bromination-intercalation, combined chlorination-intercalation, or combined nitrogenation-intercalation, followed by thermal exfoliation at a temperature from 100° C. to 2,500° C. In certain preferred embodiments, the thermal exfoliation is conducted in a constrained manner to produce a graphite or carbon material having inter-flake pores from 2 nm to 20 nm in pore size. In certain other preferred embodiments, the thermal exfoliation is conducted in a non-constrained or free-expansion manner to produce a graphite or carbon material having inter-flake pores from 20 nm to 10 μm in pore size.

DESCRIPTION OF THE PREFERRED EMBODIMENTS

Figure 1A:
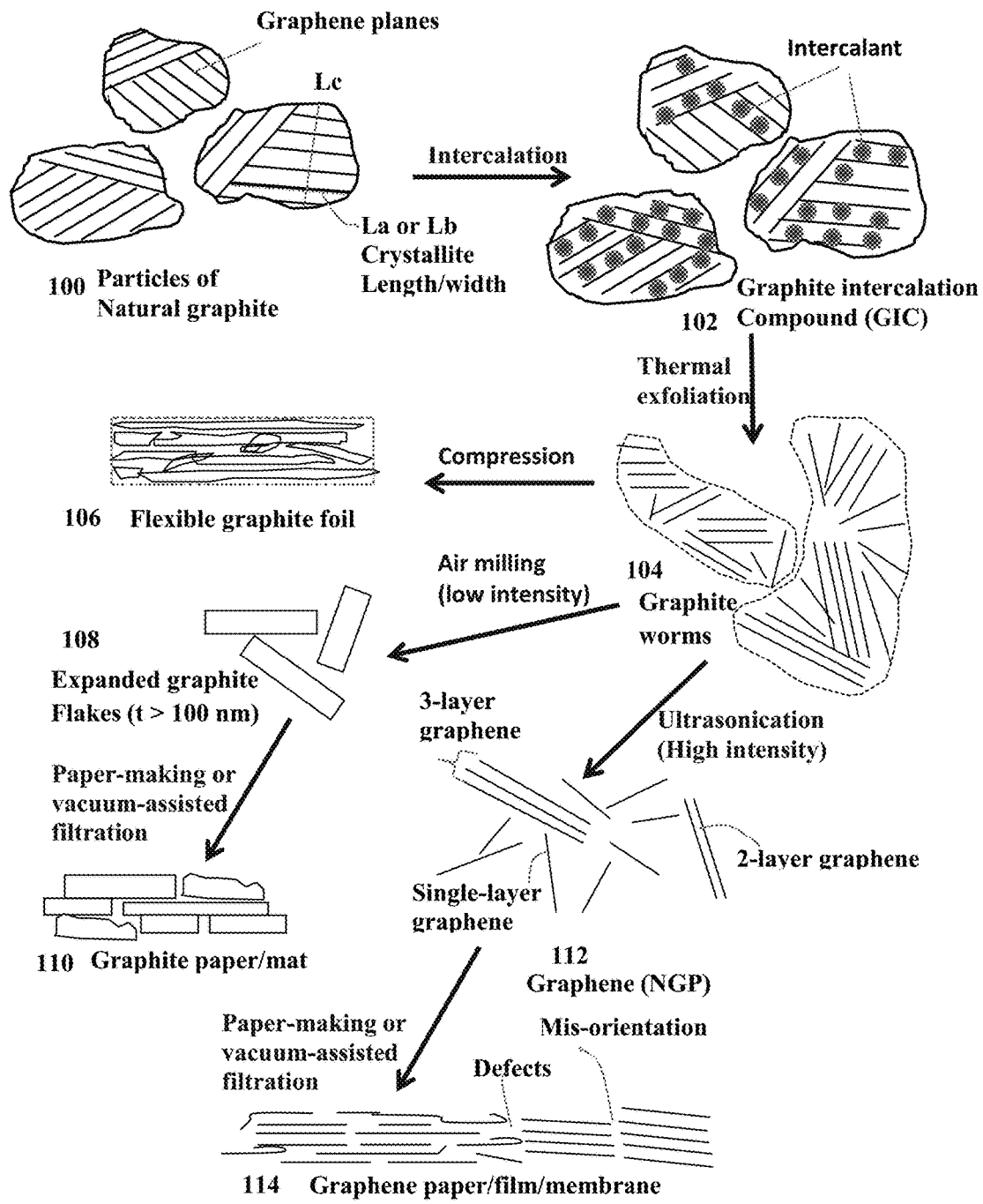
FIG. 1(A) Schematic drawing illustrating the processes for producing intercalated and/or oxidized graphite, subsequently exfoliated graphite worms, and conventional paper, mat, film, and membrane of simply aggregated graphite or graphene flakes/platelets.

As schematically illustrated in the upper portion of FIG. 1(A), bulk natural graphite is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane or hexagonal carbon atom plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). The inter-graphene plane spacing in a natural graphite material is approximately 0.3354 nm.

Artificial graphite materials also contain constituent graphene planes, but they have an inter-graphene planar spacing, $d_{002}$, typically from 0.32 nm to 0.36 nm (more typically from 0.3339 to 0.3465 nm), as measured by X-ray diffraction. Many carbon or quasi-graphite materials also contain graphite crystals (also referred to as graphite crystallites, domains, or crystal grains) that are each composed of stacked graphene planes. These include meso-carbon mocro-beads (MCMBs), meso-phase carbon, soft carbon, hard carbon, coke (e.g. needle coke), carbon or graphite fibers (including vapor-grown carbon nano-fibers or graphite nano-fibers), and multi-walled carbon nanotubes (MW-CNT). The spacing between two graphene rings or walls in a MW-CNT is approximately 0.27 to 0.42 nm. The most common spacing values in MW-CNTs are in the range of 0.32-0.35 nm, which do not strongly depend on the synthesis method.

It may be noted that the "soft carbon" refers to a carbon material containing graphite domains wherein the orientation of the hexagonal carbon planes (or graphene planes) in one domain and the orientation in neighboring graphite domains are not too mis-matched from each other so that these domains can be readily merged together when heated to a temperature above 2,000° C. (more typically above 2,500° C.). Such a heat treatment is commonly referred to as graphitization. Thus, the soft carbon can be defined as a carbonaceous material that can be graphitized. In contrast, a "hard carbon" can be defined as a carbonaceous material that contain highly mis-oriented graphite domains that cannot be thermally merged together to obtain larger domains; i.e. the hard carbon cannot be graphitized.

The spacing between constituent graphene planes of a graphite crystallite in a natural graphite, artificial graphite, and other graphitic carbon materials in the above list can be expanded (i.e. the $d_{002}$ spacing being increased from the original range of 0.27-0.42 nm to the range of 0.42-2.0 nm) using several expansion treatment approaches, including oxidation, fluorination, chlorination, bromination, iodization, nitrogenation, intercalation, combined oxidation-intercalation, combined fluorination-intercalation, combined chlorination-intercalation, combined bromination-intercalation, combined iodization-intercalation, or combined nitrogenation-intercalation of the graphite or carbon material.

Figure 1B:
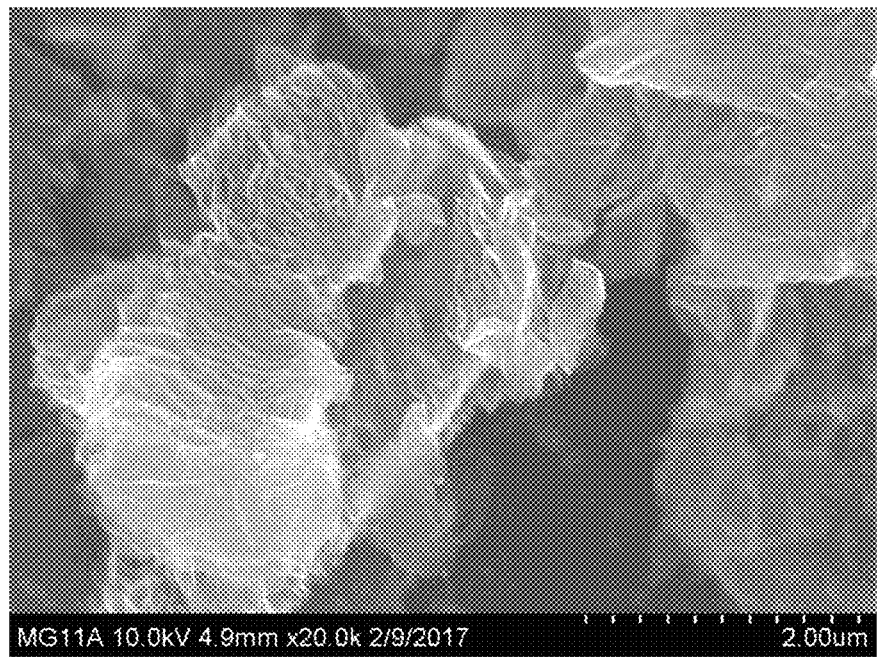
FIG. 1(B) An SEM image of exfoliated carbon (exfoliated carbon worms)
Figure 1C:
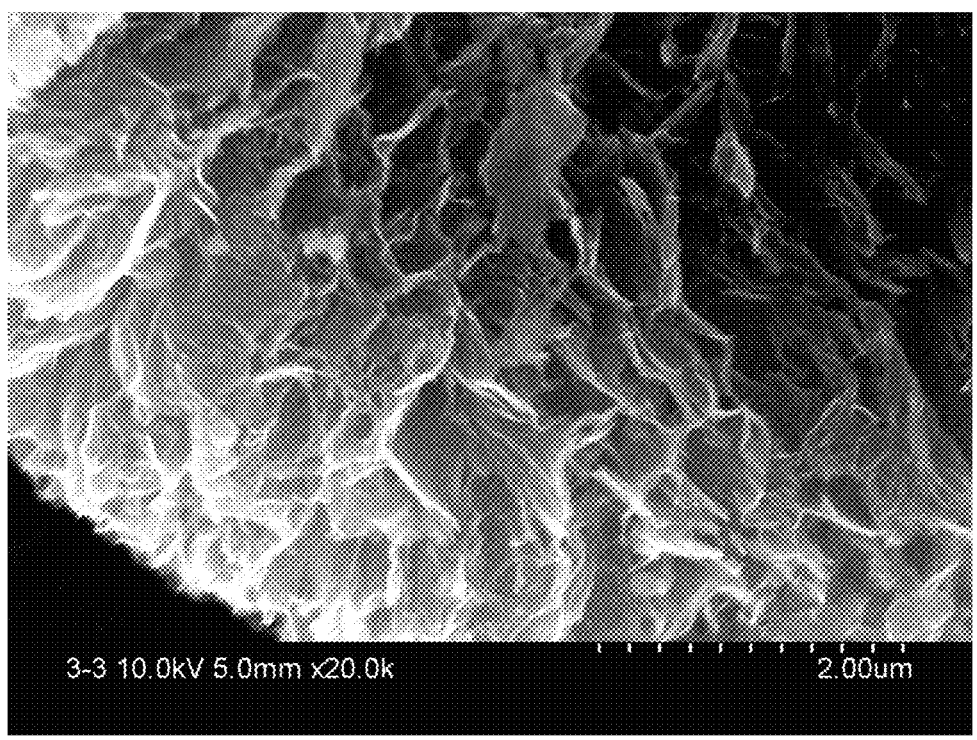
FIG. 1(C) Another SEM image of graphite worms.
Figure 1D:
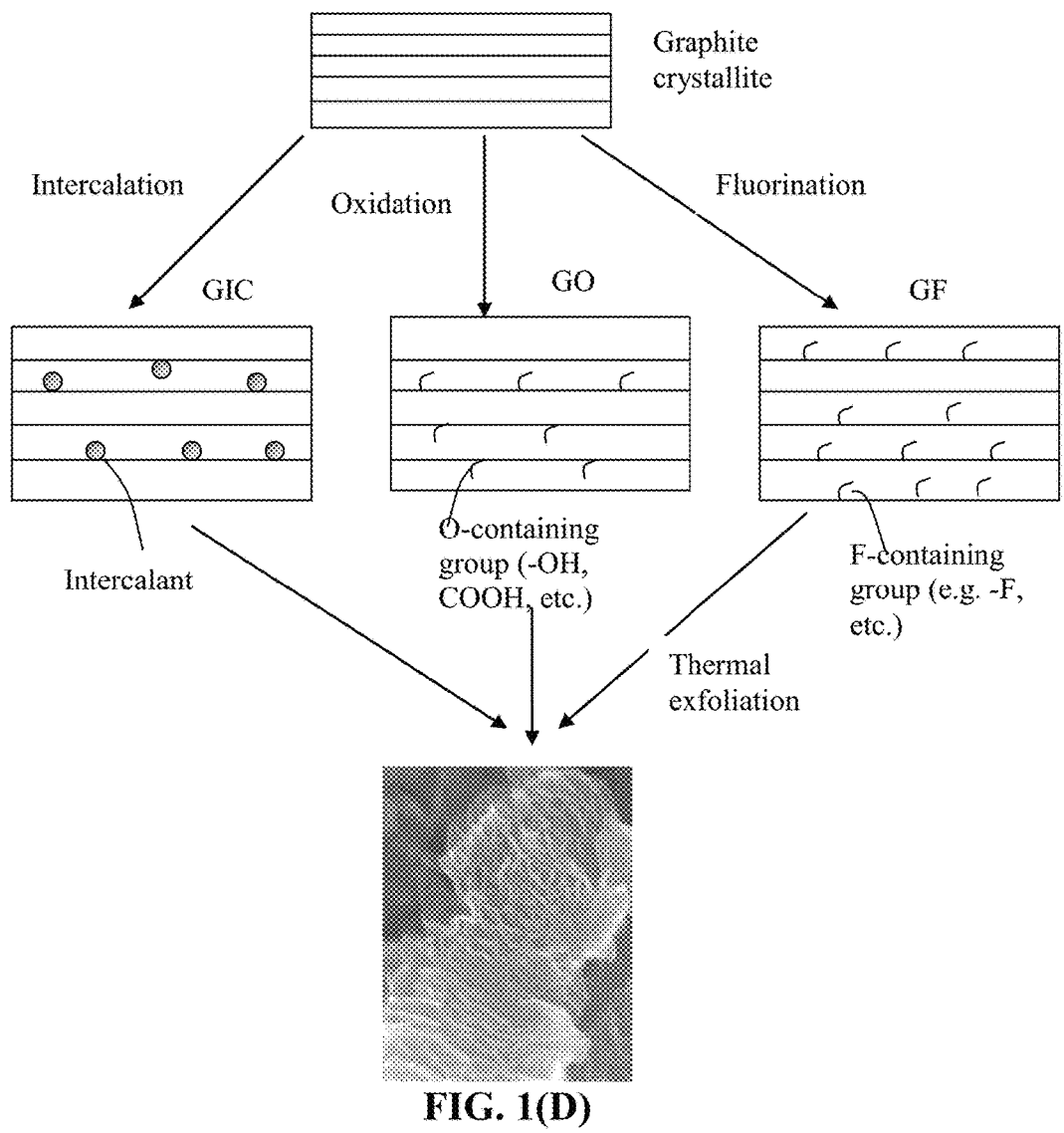
FIG. 1(D) Schematic drawing illustrating the approaches of producing thermally expanded/exfoliated graphite structures.

More specifically, due to the van der Waals forces holding the parallel graphene planes together being relatively weak, natural graphite can be treated so that the spacing between the graphene planes can be increased to provide a marked expansion in the c-axis direction. This results in a graphite material having an expanded spacing, but the laminar character of the hexagonal carbon layers is substantially retained. The inter-planar spacing (also referred to as inter-graphene spacing) of graphite crystallites can be increased (expanded) via several approaches, including oxidation, fluorination, and/or intercalation of graphite. This is schematically illustrated in FIG. 1(D). The presence of an intercalant, oxygen-containing group, or fluorine-containing group serves to increase the spacing between two graphene planes in a graphite crystallite.

The inter-planar spaces between certain graphene planes may be significantly increased (actually, exfoliated) if the graphite/carbon material having expanded d spacing is exposed to a thermal shock (e.g. by rapidly placing this carbon material in a furnace pre-set at a temperature of typically 800-2,500° C.) without constraint (i.e. being allowed to freely increase volume). Under these conditions, the thermally exfoliated graphite/carbon material appears like worms, wherein each graphite worm is composed of many graphite flakes remaining interconnected (please see FIG. 1(C)). However, these graphite flakes have inter-flake pores typically in the pore size range of 20 nm to 10 μm.

Alternatively, the intercalated, oxidized, or fluorinated graphite/carbon material having expanded d spacing may be exposed to a moderate temperature (100-800° C.) under a constant-volume condition for a sufficient length of time. The conditions may be adjusted to obtain a product of limited exfoliation, having inter-flake pores of 2-20 nm in average size. This is herein referred to as a constrained expansion/exfoliation treatment. We have surprisingly observed that an Al cell having a cathode of graphite/carbon having inter-planar spaces 2-20 nm is capable of delivering a high energy density, high power density, and long cycle life.

In one process, graphite materials having an expanded inter-planar spacing are obtained by intercalating natural graphite particles with a strong acid and/or an oxidizing agent to obtain a graphite intercalation compound (GIC) or graphite oxide (GO), as illustrated in FIG. 1(A). The presence of chemical species or functional groups in the interstitial spaces between graphene planes serves to increase the inter-graphene spacing, $d_{002}$, as determined by X-ray diffraction, thereby significantly reducing the van der Waals forces that otherwise hold graphene planes together along the c-axis direction. The GIC or GO is most often produced by immersing natural graphite powder (100 in FIG. 1(A)) in a mixture of sulfuric acid, nitric acid (an oxidizing agent), and another oxidizing agent (e.g. potassium permanganate or sodium perchlorate). The resulting GIC (102) is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water.

Water may be removed from the suspension to obtain "expandable graphite," which is essentially a mass of dried GIC or dried graphite oxide particles. The inter-graphene spacing, $d_{002}$, in the dried GIC or graphite oxide particles is typically in the range of 0.42-2.0 nm, more typically in the range of 0.5-1.2 nm. It may be noted than the "expandable graphite" is not "expanded graphite" (to be further explained later).

Upon exposure of expandable graphite to a temperature in the range of typically 800-2,500° C. (more typically 900-1,050° C.) for approximately 30 seconds to 2 minutes, the GIC undergoes a rapid volume expansion by a factor of 30-300 to form "exfoliated graphite" or "graphite worms" (104), Graphite worms are each a collection of exfoliated, but largely un-separated graphite flakes that remain interconnected (FIG. 1(B) and FIG. 1(C)). In exfoliated graphite, individual graphite flakes (each containing 1 to several hundred of graphene planes stacked together) are highly spaced from one another, having a spacing of typically 2.0 nm-10 μm. However, they remain physically interconnected, forming an accordion or worm-like structure.

In graphite industry, graphite worms can be re-compressed to obtain flexible graphite sheets or foils (106) that typically have a thickness in the range of 0.1 mm (100 μm)-0.5 mm (500 μm).

Alternatively, in graphite industry, one may choose to use a low-intensity air mill or shearing machine to simply break up the graphite worms for the purpose of producing the so-called "expanded graphite" flakes (108) which contain mostly graphite flakes or platelets thicker than 100 nm (hence, not a nano material by definition). It is clear that the "expanded graphite" is not "expandable graphite" and is not "exfoliated graphite worm" either. Rather, the "expandable graphite" can be thermally exfoliated to obtain "graphite worms," which, in turn, can be subjected to mechanical shearing to break up the otherwise interconnected graphite flakes to obtain "expanded graphite" flakes. Expanded graphite flakes typically have the same or similar inter-planar spacing (typically 0.335-0.36 nm) of their original graphite. In contrast, the present invention is not directed at expanded graphite. Rather, the present invention is directed at thermally exfoliated graphite or carbon materials having an expanded inter-flake spacing of 2.0 nm to 10 μm.

Alternatively, the exfoliated graphite or graphite worms may be subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, 112), as disclosed in our US Application 20050271574, Dec. 8, 2008. Single-layer graphene can be as thin as 0.34 nm, while multi-layer graphene can have a thickness up to 100 nm, but more typically less than 3 nm (commonly referred to as few-layer graphene). Multiple graphene sheets or platelets may be made into a sheet of NGP paper (114) using a paper-making process.

In GIC or graphite oxide, the inter-graphene plane separation has been increased from 0.3354 nm in natural graphite to 0.5-1.2 nm in highly oxidized graphite oxide, significantly weakening the van der Waals forces that hold neighboring planes together. Graphite oxide can have an oxygen content of 2%-50% by weight, more typically 20%-40% by weight. GIC or graphite oxide may be subjected to a special treatment herein referred to as "constrained thermal expansion". If GIC or graphite oxide is exposed to a thermal shock in a furnace (e.g. at 800-1,050° C.) and allowed to freely expand, the final product is exfoliated graphite worms. However, if the mass of GIC or graphite oxide is subjected to a constrained condition (e.g. being confined in an autoclave under a constant volume condition or under a uniaxial compression in a mold) while being slowly heated from 150° C. to 800° C. (more typically up to 600°) for a sufficient length of time (typically 2 minutes to 15 minutes), the extent of expansion can be constrained and controlled, and the product can have inter-flake spaces from 2.0 nm to 20 nm, or more desirably from 2 nm to 10 nm.

It may be noted that the "expandable graphite" or graphite with expanded inter-planar spacing may also be obtained by forming graphite fluoride (GF), instead of GO. Interaction of $F_2$ with graphite in a fluorine gas at high temperature leads to covalent graphite fluorides, from $(CF)_n$ to $(C_2F)_n$, while at low temperatures graphite intercalation compounds (GIC) $C_xF$ (2≤x≤24) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents (e.g. mixtures of $F_2$ with $Br_2$, $Cl_2$, or $I_2$) may be used, although most of the available literature involves fluorination with $F_2$ gas, sometimes in presence of fluorides.

We have observed that lightly fluorinated graphite, $C_xF$ (2≤x≤24), obtained from electrochemical fluorination, typically has an inter-graphene spacing ($d_{002}$) less than 0.37 nm, more typically <0.35 nm. Only when x in $C_xF$ is less than 2 (i.e. 0.5≤x<2) can one observe a $d_{002}$ spacing greater than 0.5 nm (in fluorinated graphite produced by a gaseous phase fluorination or chemical fluorination procedure). When x in $C_xF$ is less than 1.33 (i.e. 0.5≤x≤1.33) one can observe a $d_{002}$ spacing greater than 0.6 nm. This heavily fluorinated graphite is obtained by fluorination at a high temperature (>>200° C.) for a sufficiently long time, preferably under a pressure >1 atm, and more preferably >3 atm. For reasons remaining unclear, electrochemical fluorination of graphite leads to a product having a d spacing less than 0.4 nm even though the product $C_xF$ has an x value from 1 to 2. It is possible that F atoms electrochemically introduced into graphite tend to reside in defects, such as grain boundaries, instead of between graphene planes and, consequently, do not act to expand the inter-graphene planar spacing.

The nitrogenation of graphite can be conducted by exposing a graphite oxide material to ammonia at high temperatures (200-400° C.). Nitrogenation may also be conducted at lower temperatures by a hydrothermal method; e.g. by sealing GO and ammonia in an autoclave and then increased the temperature to 150-250° C.

In addition to N, O, F, Br, Cl, or H, the presence of other chemical species (e.g. Na, Li, K, Ce, Ca, Fe, $NH_4$, etc.) between graphene planes can also serve to expand the inter-planar spacing, creating room to accommodate electrochemically active materials therein. The expanded interstitial spaces between graphene planes (hexagonal carbon planes or basal planes) are found by us in this study to be surprisingly capable of accommodating $Al^{+3}$ ions and other anions (derived from electrolyte ingredients) as well, particularly when the spaces are from 2.0 nm to 20 nm. It may be noted that graphite can electrochemically intercalated with such chemical species as Na, Li, K, Ce, Ca, $NH_4$, or their combinations, which can then be chemically or electrochemically ion-exchanged with metal elements (Bi, Fe, Co, Mn, Ni, Cu, etc.). All these chemical species can serve to expand the inter-planar spacing. The spacing may be dramatically expanded (exfoliated) to have inter-flake pores that are 20 nm-10 µm in size.

The configuration of an aluminum secondary battery is now discussed as follows:

An aluminum secondary battery includes a positive electrode (cathode), a negative electrode (anode), and an electrolyte including an aluminum salt and a solvent. The anode can be a thin foil or film of aluminum metal or aluminum metal alloy (e.g. left-hand side of FIG. 2(A)). The anode can be composed of particles, fibers, wires, tubes, or discs of Al metal or Al metal alloy that are packed and bonded together by a binder (preferably a conductive binder) to form an anode layer.

Figure 2A:
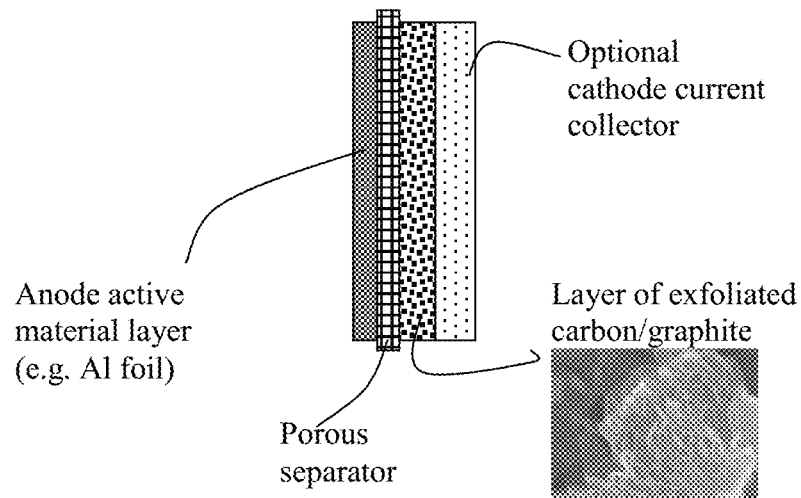
FIG. 2(A) Schematic of an aluminum secondary battery, wherein the anode layer is a thin Al coating or Al foil and the cathode active material layer contains a layer of thermally expanded/exfoliated graphite/carbon.
Figure 2B:
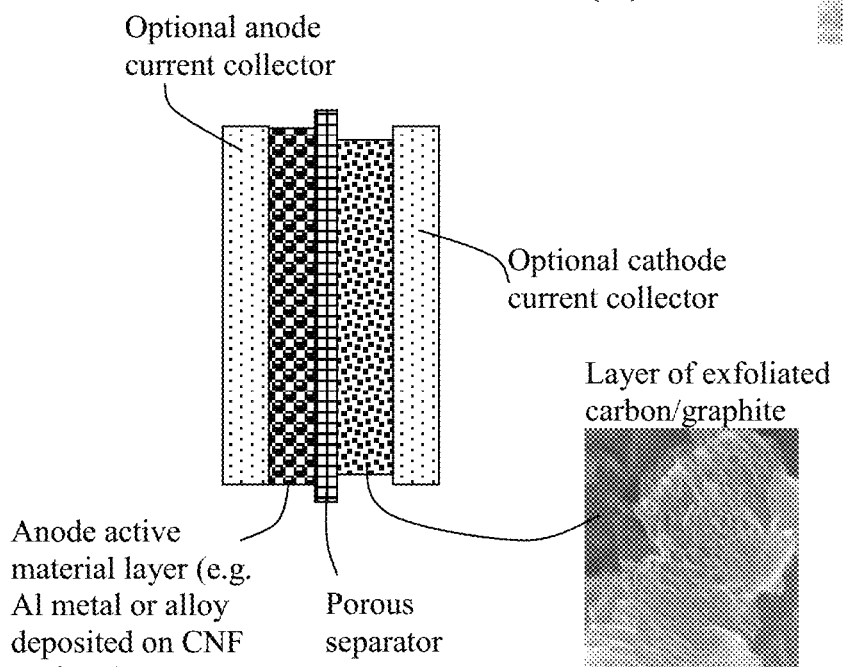
FIG. 2(B) schematic of an aluminum secondary battery cell having a cathode active material layer composed of thermally expanded/exfoliated graphite/carbon material and an anode composed of Al metal coating deposited on surfaces of a nano-structured network of conductive filaments.

A desirable anode layer structure is composed of a network of electron-conducting pathways (e.g. mat of graphene sheets, carbon nano-fibers, or carbon-nanotubes) and a thin layer of aluminum metal or alloy coating deposited on surfaces of this conductive network structure (e.g. left-hand side of FIG. 2(B)). Such an integrated nano-structure may be composed of electrically conductive nanometer-scaled filaments that are interconnected to form a porous network of electron-conducting paths comprising interconnected pores, wherein the filaments have a transverse dimension less than 500 nm. Such filaments may comprise an electrically conductive material selected from the group consisting of electro-spun nano fibers, vapor-grown carbon or graphite nano fibers, carbon or graphite whiskers, carbon nano-tubes, nano-scaled graphene platelets, metal nano wires, and combinations thereof. Such a nano-structured, porous supporting material for aluminum can significantly improve the aluminum deposition-dissolution kinetics, enabling high-rate capability of the resulting aluminum secondary cell.

Illustrated in FIG. 2(A) is a schematic of an aluminum secondary battery, wherein the anode layer is a thin Al coating or Al foil and the cathode active material layer contains a layer of thermally exfoliated graphite/carbon material having inter-flake pores in the range of 2 nm and 10 µm. Alternatively, FIG. 2(B) shows a schematic of an aluminum secondary battery cell wherein the anode layer is composed of a thin coating of aluminum metal or aluminum alloy supported on surfaces of a network of conductive filaments and the cathode active material layer contains a layer of thermally exfoliated graphite/carbon material having inter-flake pores in the range of 2 nm and 10 µm.

The composition of the electrolyte, which functions as an ion-transporting medium for charge-discharge reaction, has a great effect on battery performance. To put aluminum secondary batteries to practical use, it is necessary to allow aluminum deposition-dissolution reaction to proceed smoothly and sufficiently even at relatively low temperature (e.g., room temperature). In conventional aluminum secondary batteries, however, aluminum deposition-dissolution reaction can proceed smoothly and sufficiently only at relatively high temperature (e.g., 50° C. or higher), and the efficiency of the reaction is also low. The electrolyte for use in an aluminum secondary battery can include an aluminum salt, alkyl sulfone, and a solvent with a dielectric constant of 20 or less so that the electrolyte can operate at a lower temperature (e.g. room temperature) at which aluminum deposition-dissolution reaction proceeds.

Aqueous electrolytes that can be used in the aluminum secondary batteries include aluminum salts dissolved in water; for instance, $AlCl_3·6H_2O$, $CrCl_3·6H_2O$, and $Al(NO_3)_3$ in water. Alkaline solutions, such as KOH and NaOH in water, may also be used.

Organic electrolytes for use in aluminum secondary batteries include various electrolytes with g-butyrolactone (BLA) or acetonitrile (ACN) as solvent; e.g. $AlCl_3$/KCl salts in BLA or $(C_2H_5)_4NClxH_2O$ (TEAC) in ACN. Also included are concentrated aluminum triflate-based electrolyte, a bath of aluminum chloride and lithium aluminum hydride dissolved in diethyl ether, and $LiAlH_4$ and $AlCl_3$ in tetrahydrofuran. For example, alkyl sulfone such as dimethylsulfone may be used, along with an organic solvent such as a cyclic or chain carbonate or a cyclic or chain ether can be used. In order to reduce polarization during discharge, an aluminum salt such as aluminum chloride and an organic halide such as trimethylphenylammonium chloride may be used together in the electrolyte. For this salt mixture, an organic solvent such as 1,2-dichloroethane may be used.

Another type of electrolyte capable of reversible aluminum electrochemistry is molten salt eutectics. These are typically composed of aluminum chloride, sodium chloride, potassium chloride and lithium chloride in some molar ratio. Useful molten salt electrolytes include $AlCl_3$—NaCl, $AlCl_3$—(LiCl—KCl), and $AlCl_3$—KCl—NaCl mixtures. Among these alkali chloroaluminate melts, binary NaCl—$AlCl_3$ and ternary NaCl—KCl—$AlCl_3$ systems are the most widely used molten salts for developing aluminum batteries. In these systems the melts with molar ratio of $MCl/AlCl_3$ (where M is commonly Na and/or K) larger than unity are defined as basic, whereas those with molar ratio less than unity as acidic. In an acidic melt, $Al_2Cl_7$ is the major anion species. As the acidity ($AlCl_3$ content) of the melt decreases, $AlCl_4^-$ becomes the major species.

A special class of molten salt for use in an aluminum secondary battery is room temperature molten salts (ionic liquids). For instance, a useful ionic liquid electrolyte solution is aluminum chloride mixed in 1-ethyl-3-methylimidazolium chloride ($AlCl_3$:EMIC). Commercially available 1-ethyl-3-methylimidazolium chloride may be purified by recrystallization from ethyl acetate and acetonitrile. Aluminum chloride may be further purified by triple sublimation. The ionic liquid may be prepared by slowly mixing molar equivalent amounts of both salts. Further, $AlCl_3$ was then added to the equimolar mix until a concentration of 1M $AlCl_3$ was obtained. Desirably, this concentration corresponds to a molar ratio of 1.2:1, $AlCl_3$:EMIC.

Aluminum chloride ($AlCl_3$) also forms room temperature electrolytes with organic chlorides, such as n-butyl-pyridinium-chloride (BuPyCl), 1-methyl-3-ethylimidazolium-chloride (MEICl), and 2-dimethyl-3-propylimidazolium-chloride. The molten mixture of 1,4-dimethyl-1,2,4-triazolium chloride (DMTC) and $AlCl_3$ may also be used as the secondary battery electrolyte.

This invention is directed at the cathode active layer (positive electrode layer) containing a high-capacity cathode material for the aluminum secondary battery. The invention also provides such a battery based on an aqueous electrolyte, a non-aqueous electrolyte, a molten salt electrolyte, a polymer gel electrolyte (e.g. containing an aluminum salt, a liquid, and a polymer dissolved in the liquid), or an ionic liquid electrolyte. The shape of an aluminum secondary battery can be cylindrical, square, button-like, etc. The present invention is not limited to any battery shape or configuration.

The following examples are used to illustrate some specific details about the best modes of practicing the instant invention and should not be construed as limiting the scope of the invention.

Example 1: Oxidation of Graphite and Thermal Expansion/Exfoliation of Oxidized Graphite Natural flake graphite, nominally sized at 45 provided by Asbury Carbons (405 Old Main St., Asbury, N.J. 08802, USA) was milled to reduce the size to approximately 14 (Sample 1a). The chemicals used in the present study, including fuming nitric acid (>90%), sulfuric acid (95-98%), potassium chlorate (98%), and hydrochloric acid (37%), were purchased from Sigma-Aldrich and used as received. Graphite oxide (GO) samples were prepared according to the following procedure:

Sample 1A: A reaction flask containing a magnetic stir bar was charged with sulfuric acid (176 mL) and nitric acid (90 mL) and cooled by immersion in an ice bath. The acid mixture was stirred and allowed to cool for 15 min, and graphite (10 g) was added under vigorous stirring to avoid agglomeration. After the graphite powder was well dispersed, potassium chlorate (110 g) was added slowly over 15 min to avoid sudden increases in temperature. The reaction flask was loosely capped to allow evolution of gas from the reaction mixture, which was stirred for 24 hours at room temperature. On completion of the reaction, the mixture was poured into 8 L of deionized water and filtered. The GO was re-dispersed and washed in a 5% solution of HCl to remove sulphate ions. The filtrate was tested intermittently with barium chloride to determine if sulphate ions are present. The HCl washing step was repeated until this test was negative. The GO was then washed repeatedly with deionized water until the pH of the filtrate was neutral. The GO slurry was spray-dried and stored in a vacuum oven at 60° C. until use.

Sample 1B: The same procedure as in Sample 1A was followed, but the reaction time was 48 hours.

Sample 1C: The same procedure as in Sample 1A was followed, but the reaction time was 96 hours.

X-ray diffraction studies showed that after a treatment of 24 hours, a significant proportion of graphite has been transformed into graphite oxide. The peak at 2θ=26.3 degrees, corresponding to an inter-planar spacing of 0.335 nm (3.35 Å) for pristine natural graphite was significantly reduced in intensity after a deep oxidation treatment for 24 hours and a peak typically near 2θ=9-14 degrees (depending upon degree of oxidation) appeared. In the present study, the curves for treatment times of 48 and 96 hours are essentially identical, showing that essentially all of the graphite crystals have been converted into graphite oxide with an inter-planar spacing of 6.5-7.5 Å (the 26.3 degree peak has totally disappeared and a peak of approximately at 2θ=11.75-13.7 degrees appeared).

Samples 1A, 1B, and 1C were then subjected to both free thermal exfoliation (1,050° C. for 2 minutes) and constrained thermal expansion/exfoliation (slowly heated from 100° C. to 450° C. in a span of 15 minutes) to obtain thermally exfoliated graphite worms having different ranges of inter-flake pore sizes between different samples.

Example 2: Oxidation and Intercalation of Various Graphitic Carbon and Graphite Materials Samples 2A, 2B, 2C, and 2D were prepared according to the same procedure used for Sample 1B, but the starting graphite materials were pieces of highly oriented pyrolytic graphite (HOPG), graphite fiber, graphitic carbon nano-fiber, and spheroidal graphite, respectively. After the expansion treatment, their final inter-planar spacings are 6.6 Å, 7.3 Å, 7.3 Å, and 6.6 Å, respectively. They were subsequently exfoliated to obtain samples of various controlled inter-flake pore sizes.

Example 3: Preparation of Graphite Oxide (GO) Using a Modified Hummers' Method

Graphite oxide (Sample 3A) was prepared by oxidation of natural graphite flakes with sulfuric acid, sodium nitrate, and potassium permanganate according to the method of Hummers [U.S. Pat. No. 2,798,878, Jul. 9, 1957]. In this example, for every 1 gram of graphite, we used a mixture of 22 ml of concentrated sulfuric acid, 2.8 grams of potassium permanganate, and 0.5 grams of sodium nitrate. The graphite flakes were immersed in the mixture solution and the reaction time was approximately one hour at 35.degree. C. It is important to caution that potassium permanganate should be gradually added to sulfuric acid in a well-controlled manner to avoid overheat and other safety issues. Upon completion of the reaction, the mixture was poured into deionized water and filtered. The sample was then washed repeatedly with deionized water until the pH of the filtrate was approximately 5. The slurry was spray-dried and stored in a vacuum oven at 60° C. for 24 hours. The interlayer spacing of the resulting laminar graphite oxide was determined by the Debye-Scherrer X-ray technique to be approximately 0.73 nm (7.3 Å). Some of the powder was subsequently exfoliated in a furnace, pre-set at 950-1,100° C., for 2 minutes to obtain thermally exfoliated graphite worms.

Example 4: Oxidation of Meso-Carbon Micro-Beads (MCMBs)

Graphite oxide (Sample 4A) was prepared by oxidation of meso-carbon micro-beads (MCMBs) according to the same procedure used in Example 3. MCMB 2528 microbeads (Sample 4a) were supplied by Alumina Trading, which is the U.S. distributor for the supplier, Osaka Gas Company of Japan. This material has a density of about 2.24 g/cm$^3$; a particle size maximum for at least 95% by weight of the particles of 37 microns; median size of about 22.5 microns and an inter-planar distance of about 0.336 nm. After deep oxidation treatment, the inter-planar spacing in the resulting graphite oxide micro-beads is approximately 0.76 nm. Upon constrained expansion/exfoliation for 3 minutes at 200° C., the exfoliated carbon has inter-flake pores with a size of 3 nm-15 nm.

Example 5: Bromination and Fluorination of Carbon Fibers

Graphitized carbon fiber (Sample 5a), having an inter-planar spacing of 3.37 Å (0.337 nm) and a fiber diameter of 10 μm was first halogenated with a combination of bromine and iodine at temperatures ranging from 75° C. to 115° C. to form a bromine-iodine intercalation compound of graphite as an intermediate product. The intermediate product was then reacted with fluorine gas at temperatures ranging from 275° C. to 450° C. to form the $CF_y$. The value of y in the $CF_y$ samples was approximately 0.6-0.9. X-ray diffraction curves typically show the co-existence of two peaks corresponding to 0.59 nm and 0.88 nm, respectively. Sample 5A exhibits substantially 0.59 nm peak only and Sample 5B exhibits substantially 0.88 nm peak only. Some of powders were thermally exfoliated.

Example 6: Fluorination of Carbon Fibers

A $CF_{0.68}$ sample obtained in EXAMPLE 5 was exposed at 250° C. and 1 atmosphere to vapors of 1,4-dibromo-2-butene ($BrH_2C$—$CH$=$CH$—$CH_2Br$) for 3 hours. It was found that two-thirds of the fluorine was lost from the graphite fluoride sample. It is speculated that 1,4-dibromo-2-butene actively reacts with graphite fluoride, removing fluorine from the graphite fluoride and forming bonds to carbon atoms in the graphite lattice. The resulting product (Sample 6A) is mixed halogenated graphite, likely a combination of graphite fluoride and graphite bromide. Some of powders was thermally exfoliated to obtain exfoliated carbon fibers having a pore size in the range of 10 nm to 255 nm.

Example 7: Fluorination of Graphite

Natural graphite flakes, a sieve size of 200 to 250 mesh, were heated in vacuum (under less than $10^{-2}$ mmHg) for about 2 hours to remove the residual moisture contained in the graphite. Fluorine gas was introduced into a reactor and the reaction was allowed to proceed at 375° C. for 120 hours while maintaining the fluorine pressure at 200 mmHg. This was based on the procedure suggested by Watanabe, et al. disclosed in U.S. Pat. No. 4,139,474. The powder product obtained was black in color. The fluorine content of the product was measured as follows: The product was burnt according to the oxygen flask combustion method and the fluorine was absorbed into water as hydrogen fluoride. The amount of fluorine was determined by employing a fluorine ion electrode. From the result, we obtained a GF (Sample 7A) having an empirical formula $(CF_{0.75})_n$. X-ray diffraction indicated a major (002) peak at $2\theta=13.5$ degrees, corresponding to an inter-planar spacing of 6.25 Å. Some of the graphite fluoride powder was thermally exfoliated (constrained) to form graphite worms having pore sizes in the range of 3.5 nm to 15.6 nm.

Sample 7B was obtained in a manner similar to that for Sample 7A, but at a reaction temperature of 640° C. for 5 hours. The chemical composition was determined to be $(CF_{0.93})_n$. X-ray diffraction indicated a major (002) peak at $2\theta=9.5$ degrees, corresponding to an inter-planar spacing of 9.2 Å. Some of the graphite fluoride powder was thermally exfoliated to form graphite worms having pore sizes in the range of 158 nm to 455 nm.

Example 8: Preparation of Carbon-Coated GO Particles

Two polymeric carbon-coated GO samples (Samples 8-A and 8-B) were prepared by mixing GO particles (prepared in Example 3 and Example 4, respectively) with a phenol resin to obtain a mixture comprising 20% by volume of phenol resin in each case. The mixture was cured at 200° C. for one hour and then carbonized in an argon atmosphere at a temperature of 500° C. under a constant-volume condition. Then, the carbonized product was ground and milled to obtain particles of 1 to 23 μm, with an average diameter of approximately 13 μm. The inter-planar spacing was determined to be approximately 0.73 nm and 0.76 nm, respectively, prior to the constrained expansion treatment. After this constrained expansion/exfoliation treatment, the d spacing of the GO particles was increased to 2.2-5.0 nm (Samples 8-E and 8-F).

Example 9: Preparation of Carbon-Coated GF Particles

Natural flake graphite, milled to an average size of approximately 14 microns, was subjected to the same fluorination treatment as described in Example 7 and determined to be $(CF_{0.75})_n$ (Sample 7B). The resulting powder was subjected to a chemical vapor deposition (CVD) of amorphous carbon according to a procedure suggested by Tanaka, et al., U.S. Pat. No. 5,344,726. A $(CF_{0.75})_n$ sample powder of 50 mg was placed in a quartz tube reactor, and then argon gas and propane gas were supplied from an argon supply line and a propane supply line, respectively. Then, a propane concentration of raw gas was set to 10 mole % by handling needle valves. Flow velocity of the raw gas was set to 12.7 cm/min and an amount of supply of propane was set to 0.05 mol/h. It may be noted that a hydrocarbon or its derivatives other than propane may be used as a raw material. More specifically, an aliphatic hydrocarbon, an aromatic hydrocarbon, an alicyclic hydrocarbon or the like may be used. Further specifically, methane, ethane, butane, benzene, toluene, naphthalene, acetylene, biphenyl and substitution products thereof may be used. The powder was heated by a furnace at approximately 750° C. under a constant-volume condition, whereby propane supplied from a pyrex tube was pyrolytically decomposed with a pyrolysis carbon being deposited on the surface of the graphite fluoride powder. The resulting material was milled to become fine particles of approximately 16.5 microns, which are essentially amorphous carbon-coated GF particles (Sample 9B). The particles were thermally exfoliated under a constant volume condition at 150° C. for 10 minutes to obtain exfoliated graphite having pore sizes of 3-8 nm.

Example 10: Preparation and Testing of Various Aluminum Cells

The exfoliated carbon/graphite materials prepared in Examples 1-9 were separately made into a cathode layer and incorporated into an aluminum secondary battery. Two types of Al anode were prepared. One was Al foil having a thickness from 16 μm to 300 μm. The other was Al thin coating deposited on surfaces of conductive nano-filaments (e.g. CNTs) or graphene sheets that form an integrated 3D network of electron-conducting pathways having pores and pore walls to accept Al or Al alloy. Either the Al foil itself or the integrated 3D nano-structure also serves as the anode current collector.

Cyclic voltammetry (CV) measurements were carried out using an Arbin electrochemical workstation at a typical scanning rate of 0.5-50 mV/s. In addition, the electrochemical performances of various cells were also evaluated by galvanostatic charge/discharge cycling at a current density from 50 mA/g to 10 A/g. For long-term cycling tests, multi-channel battery testers manufactured by LAND were used.

Figure 3A:
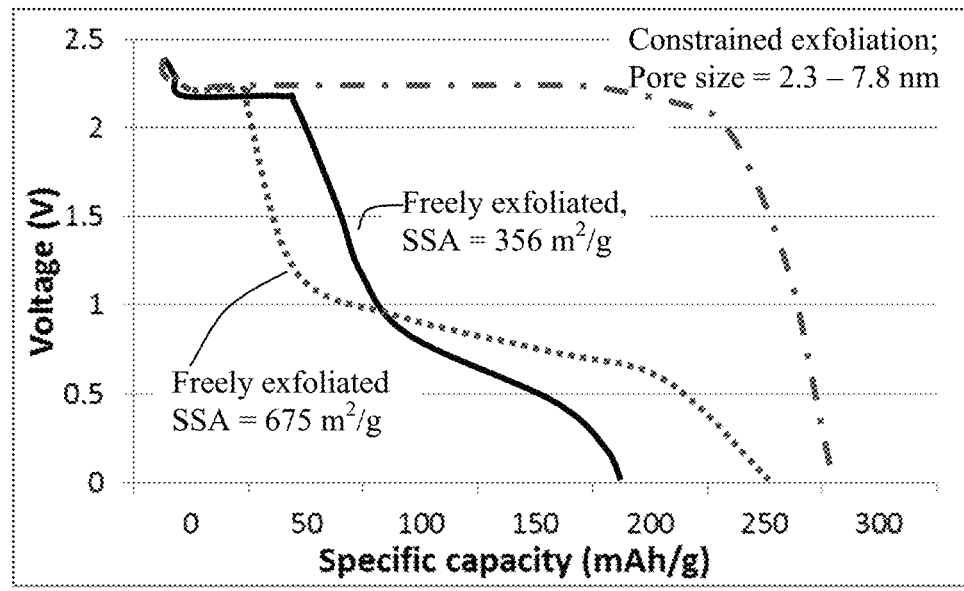
FIG. 3(A) The discharge curves of three Al foil anode-based cells each having an exfoliated graphite-based cathode: first one having an intercalated graphite that was thermally expanded/exfoliated under a constant-volume condition (inter-flake pore size 2.3 nm-7.8 nm), second one having an intercalated graphite that was freely exfoliated (specific surface area=356 m²/g), and third one having an intercalated graphite that was freely exfoliated (specific surface area=675 m²/g).

FIG. 3(A) shows the discharge curves of three Al foil anode-based cells each having an exfoliated graphite-based cathode: first one having an intercalated graphite that was thermally expanded/exfoliated under a constant-volume condition (inter-flake pore size 2.3 nm-7.8 nm), second one having an intercalated graphite that was freely exfoliated (specific surface area=356 m²/g), and third one having an intercalated graphite that was freely exfoliated (specific surface area=675 m²/g). The electrolyte used was aluminum chloride mixed in 1-ethyl-3-methylimidazolium chloride (AlCl₃:EMIC molar ratio=3.5/1). These data indicate that the three battery cells all exhibit an initial plateau voltage, but the length of this plateau varied with different thermal exfoliation conditions. The cathode layer obtained from constrained expansion (not allowed to freely expand/exfoliate) exhibits the longest plateau; this mechanism quite likely corresponds to intercalation of $Al^{3+}$, $AlCl_4^-$, and/or $Al_2Cl_7^-$ ions into the nano pores or interstitial spaces between graphite flakes or graphene planes, further explained below:

In the discharge process, Al metal is oxidized and released from Al foil to form $Al^{3+}$ ions. Under the influence of the electric field, $Al^{3+}$ ions move to the cathode side. Then $Al^{3+}$ ions and aluminum chloride coordination anions $[Al_aCl_b]^-$ can simultaneously intercalate into the graphite layers, forming $Al_xCl_y$. The intercalated $Al_xCl_y$ and neighboring graphite layers interact with each other by van der Waals' forces. During the charge process, the electrochemical reactions are just the opposite.

In the as-prepared ionic liquid, the existing coordination ions are $AlCl_4^-$ or $Al_2Cl_7^-$, and thus the intercalated coordination ion $[Al_aCl_b]^-$ might be $AlCl_4^-$ or $Al_2Cl_7^-$ or a mixture thereof. Based on the above assumption, the electrode reactions for both anode and cathode may be described as follows:

In the charge process,

$$Al^{3+} + 3e^- \rightarrow Al \text{ (anode)} \quad (1)$$

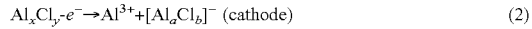

$$Al_xCl_y - e^- \rightarrow Al^{3+} + [Al_aCl_b]^- \text{ (cathode)} \quad (2)$$

At the anode, during battery charging, $Al_2Cl_7^-$ ions can react with electrons to form $AlCl_4^-$ anions and Al. At the cathode, desorption of $EMI^+$ ions from graphite surfaces may also occur.

In the discharge process,

$$Al - 3e^- \rightarrow Al^{3+} \text{ (anode)} \quad (3)$$

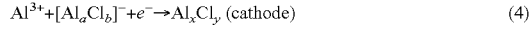

$$Al^{3+} + [Al_aCl_b]^- + e^- \rightarrow Al_xCl_y \text{ (cathode)} \quad (4)$$

It appears that the partial exfoliation strategy (constrained thermal expansion) of limiting the inter-planar spaces between original graphene planes to being smaller than 20 nm, preferably smaller than 10 nm (having the inter-flake pores <10 nm) enables massive amounts of the ions to "intercalate" into these confined spaces at a reasonably high voltage (2.2 vs. Al/$Al^{3+}$). Such an intercalation at a relatively high voltage over a long plateau range (large specific capacity, up to 250-350 mAh/g, depending on pore sizes) implies a high specific energy value (obtained by integrating the voltage curve over the specific capacity range) based on the cathode active material weight.

When the intercalated/oxidized/fluorinated graphite/carbon materials were subjected to free thermal exfoliation (without constraint), many of the initially expanded interstitial spaces got further expanded and exfoliated to create thin graphite flakes having inter-flake pores in the range of 20 nm to 10 This would leave behind lesser amounts of inter-planar spaces between hexagonal carbon atom planes to accommodate intercalated ions of $Al^{3+}$, $AlCl_4^-$, and/or $Al_2Cl_7^-$. However, more surface areas become accessible to liquid electrolyte and the surfaces would become available for ion adsorption/desorption and/or surface redox reactions, leading to supercapacitor-type behaviors (electric double layer capacitance, EDLC, or redox pseudo-capacitance).

The slopping voltage curves after a short initial plateau regime for two freely exfoliated samples are shown in FIG. 3(A), one having a specific surface area (SSA) of 356 and 675 m²/g, respectively. A larger SSA leads to a shorter plateau length and a longer slopping voltage curve.

Figure 3B:
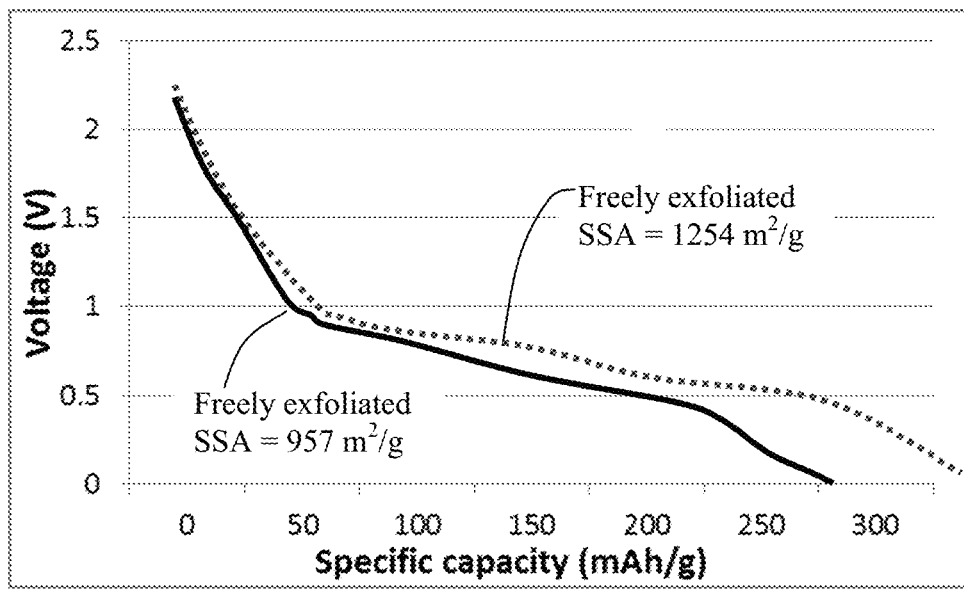
FIG. 3(B) The discharge curves of two Al foil anode-based cells each having a freely exfoliated graphite-based cathode having a SSA of 957 and 1,254 m²/g, respectively.
Figure 4:
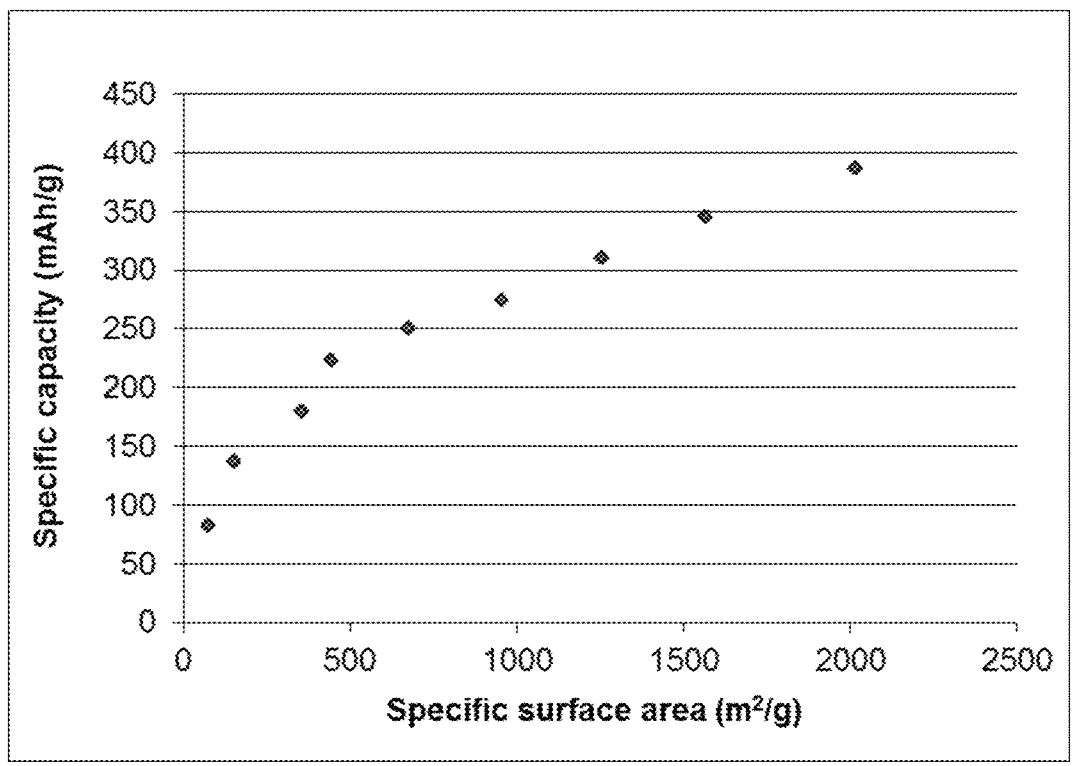
FIG. 4 The specific capacity values of a wide variety of thermally exfoliated carbon or graphite materials plotted as a function of the specific surface area.

We have observed that the plateau regime totally disappears when the freely exfoliated graphite/carbon material exhibits a SSA that exceeds approximately 800-900 m²/g. For instance, FIG. 3(B) shows the discharge curves of two samples having a SSA of 957 and 1,254 m²/g, respectively. None of them have a plateau regime. The slopping voltage curves during battery discharge are likely due to desorption of $AlCl_4^-$ anions and $EMI^+$ ions from graphite surfaces. In general, the specific capacity of the exfoliated graphite/carbon materials scales with the specific capacity of the materials, as indicated in FIG. 4.

In summary, the charge or discharge of the invented cathode layer can involve several charge storage mechanisms. Not wishing to be bound by theory, but we believe that the main mechanisms at the cathode during battery charging are (1) desorption of $EMI^+$ ions from graphite surfaces, (2) de-intercalation by $Al^{3+}$ and $AlCl_4^-$ from the inter-planar spaces, and (3) desorption of $AlCl_4^-$ and $Al_2Cl_7^-$ ions from graphite flake surfaces. At the anode, during battery charging, $Al_2Cl_7^-$ ions can react with electrons to form $AlCl_4^-$ anions and Al, wherein $AlCl_4^-$ anions move toward the cathode and Al deposits on Al foil or surface of the anode current collector. The $Al^{3+}$ ions released from the cathode may also react with electrons to form Al metal atoms that re-deposit onto Al foil surface or the surface of an anode current collector. Some $EMI^+$ ions may form electric double layers near the anode surfaces. The above processes are reversed when the battery is discharged. Different mechanisms dominate in different regimes of the charge-discharge curves for the cathodes having different amounts of controlled interstitial spaces (2-20 nm) and inter-flake pores (20 nm-10 μm) prepared by different procedures (constrained and free exfoliation).

Figure 5:
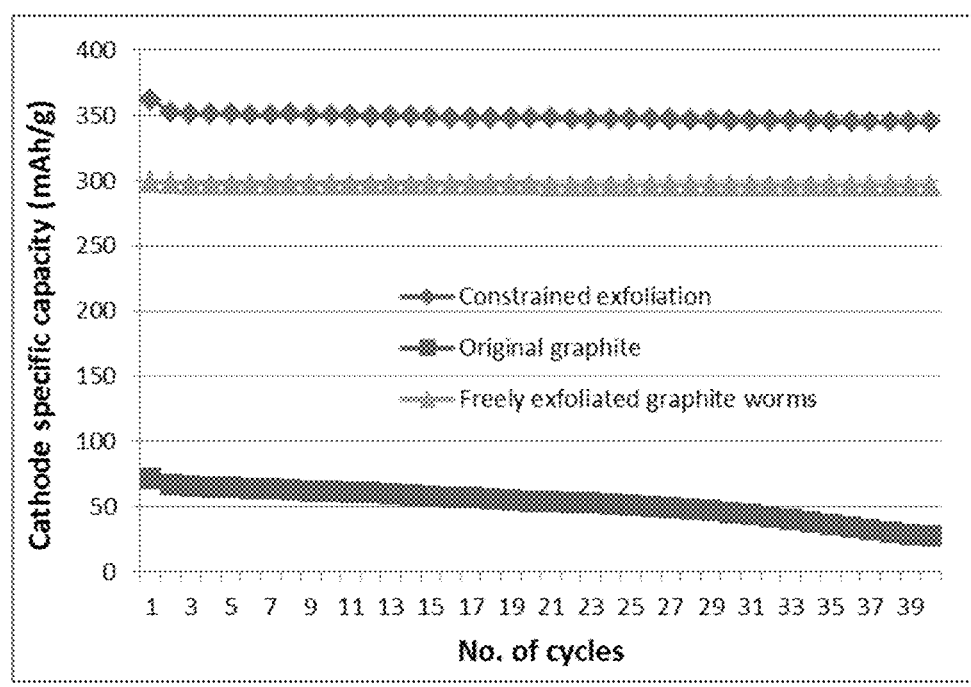
FIG. 5 The specific capacity values of three Al cells plotted as a function of charge/discharge cycles: a cell containing a cathode layer of graphite subjected to constrained expansion/exfoliation, a cell containing a cathode layer of freely exfoliated graphite, and a cell containing a cathode of original graphite.
Figure 7:
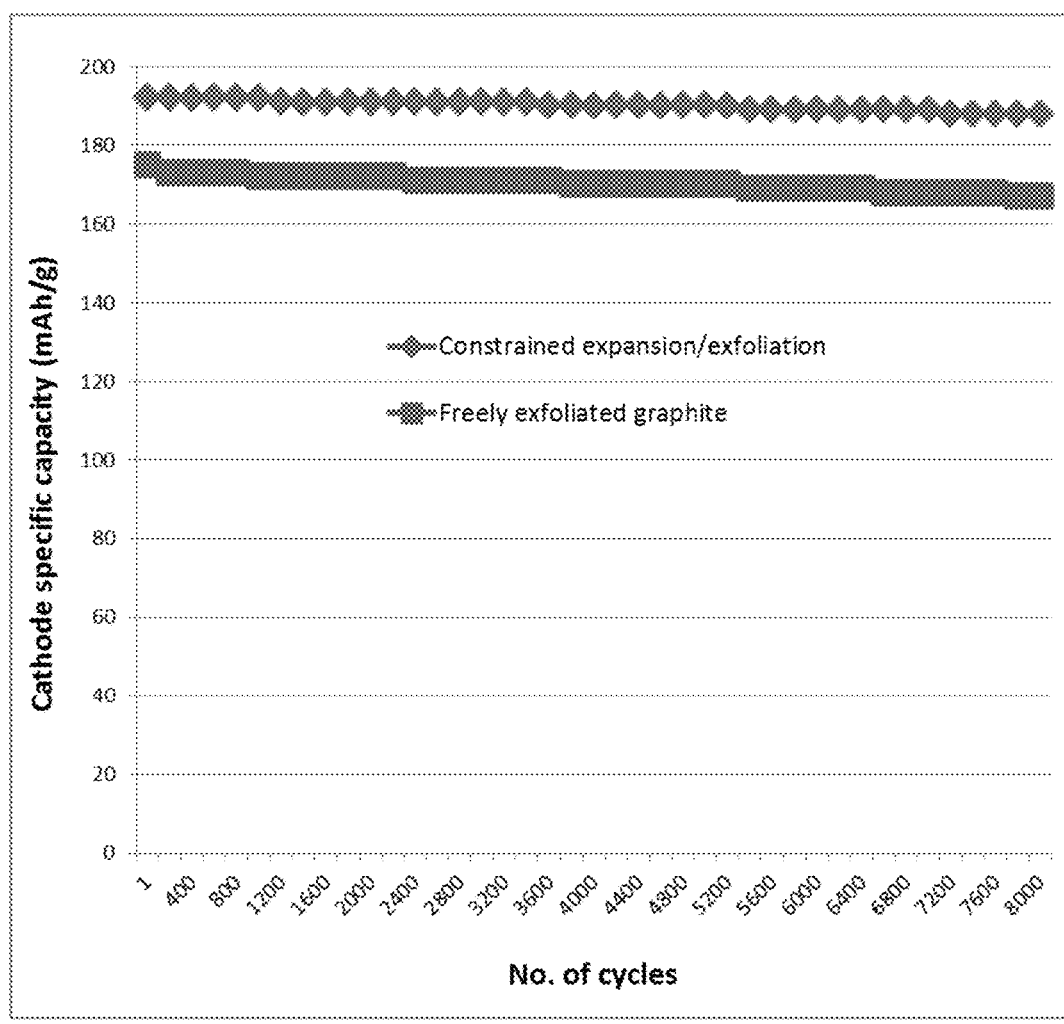
FIG. 7 The specific capacity values, plotted as a function of charge/discharge cycles, of two Al cells, one containing a cathode of constrained expansion-type graphite cathode and the other free thermal exfoliation type graphite cathode.

FIG. 5 shows the specific capacity values of three Al cells plotted as a function of charge/discharge cycles: a cell containing a cathode layer of graphite with constrained expansion/exfoliation, a cell containing a cathode layer of freely exfoliated graphite, and a cell containing a cathode of original graphite. These data demonstrate that, compared with the original graphite, the constrained expansion of an intercalated/fluorinated/oxidized carbon/graphite material can further expand the interstitial spaces (up to 2-20 nm) in a controlled manner, leading to a significantly higher charge storage capacity. Un-constrained or free thermal exfoliation of the intercalated/fluorinated/oxidized carbon/graphite material, implemented at the cathode of an Al cell, can also store more charges; but the mechanism is dominated mainly by surface adsorption/desorption or surface redox. Both types of Al cells (containing constrained expansion or free exfoliation type cathodes) exhibit very stable cycling behaviors. This is further evidenced in FIG. 7 that shows the charge-discharge capacity values remaining substantially unchanged up to 8,000 cycles. The presently invented aluminum cells exhibit some supercapacitor-like behavior (having long cycle life) and some lithium ion battery-like behavior (moderate energy density).

Figure 6:
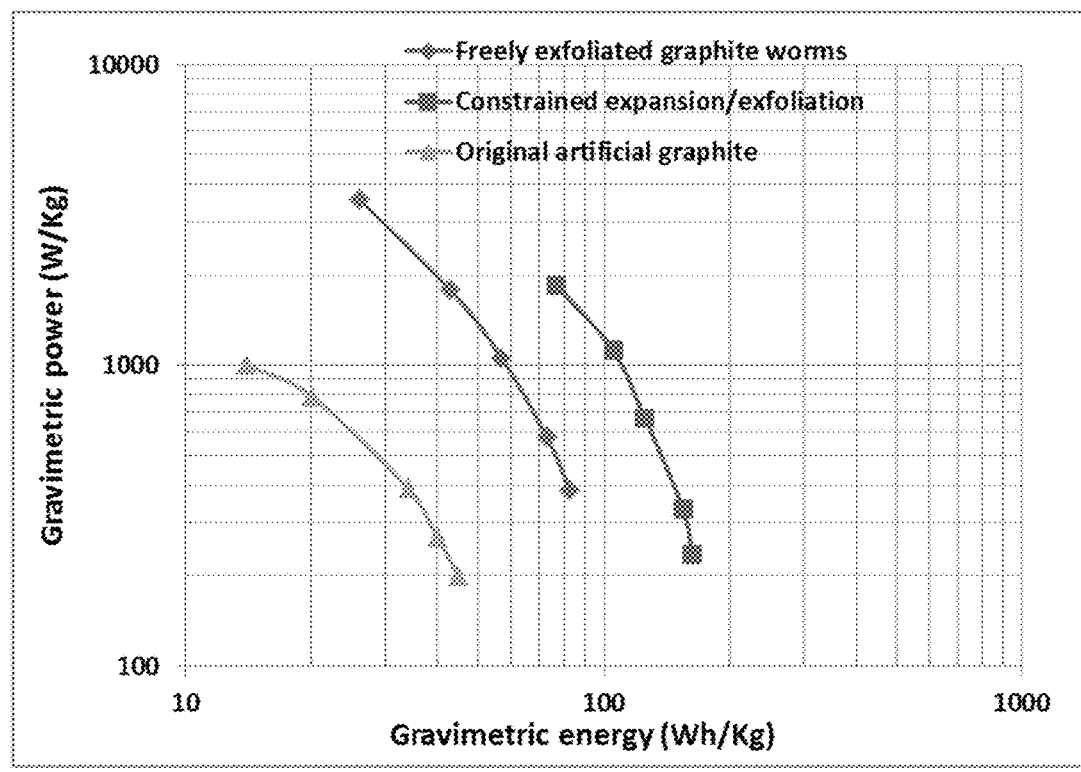
FIG. 6 The Ragone plots of three cells: a cell containing a cathode of original artificial graphite, a cell containing a cathode of artificial graphite that has been oxidized and then subjected to constrained expansion, and a cell containing a cathode of artificial graphite that has been oxidized and then freely thermally exfoliated without constraint.

FIG. 6 shows the Ragone plots of three cells: a cell containing a cathode of original artificial graphite, a cell containing a cathode of artificial graphite that has been oxidized and then subjected to constrained expansion, and a cell containing a cathode of artificial graphite that has been oxidized and then thermally exfoliated without constraint.

There are several unexpected results. The first is the observation that the Al cell featuring a cathode of artificial graphite that has been expanded/exfoliated in a constrained and controlled manner exhibits the highest cell-level specific energy, reaching as high as 162 Wh/kg, comparable to that of the lithium-ion battery. The power density, 1,846 W/kg, is significantly higher than the power density (typically <500 W/kg) of the lithium-ion battery. The second is the notion that the Al cell containing a cathode of freely exfoliated artificial graphite worms delivers a power density (3,545 W/k) as high as that of the current supercapacitor, yet being capable of storing up to an energy density of 83 Wh/kg, 12-times higher than those (5-6 Wh/kg) of an EDLC supercapacitor.

We claim:

1. An aluminum secondary battery comprising an anode, a cathode, and an electrolyte in ionic contact with said anode and said cathode to support reversible deposition and dissolution of aluminum at said anode, wherein said anode contains aluminum metal or an aluminum metal alloy as an anode active material and said cathode comprises a cathode active layer of an exfoliated graphite or carbon material having inter-flake pores from 2 nm to 10 µm in pore size, wherein when said battery has an average discharge voltage from 1.5 volts to 2.0 volts, said battery has a cathode specific capacity greater than 200 mAh/g based on a total cathode active layer weight and when said battery has an average discharge voltage greater than 2.0 volts, said battery has a cathode specific capacity greater than 100 mAh/g based on total cathode active layer weight.

2. The aluminum secondary battery of claim 1, wherein said exfoliated carbon or graphite material in said cathode active layer is selected from a thermally exfoliated product of meso-phase pitch, meso-phase carbon, meso carbon micro-beads (MCMB), coke particles, expanded graphite flakes, artificial graphite particles, natural graphite particles, highly oriented pyrolytic graphite, soft carbon particles, hard carbon particles, multi-walled carbon nanotubes, carbon nano-fibers, carbon fibers, graphite nano-fibers, graphite fibers, carbonized polymer fibers, or a combination thereof.

3. The aluminum secondary battery of claim 1, wherein said inter-flake pores have a pore size from 2 nm to 20 nm.

4. The aluminum secondary battery of claim 1, wherein said inter-flake pores have a pore size from 2 nm to 5 nm.

5. The aluminum secondary battery of claim 1, wherein said exfoliated carbon or graphite material has a specific surface area from 100 $m^2/g$ to 3,000 $m^2/g$.

6. The aluminum secondary battery of claim 1, further comprising an anode current collector supporting said aluminum metal or aluminum metal alloy or further comprising a cathode current collector supporting said cathode active layer of graphite or carbon material.

7. The aluminum secondary battery of claim 6, wherein said anode current collector contains an integrated nanostructure of electrically conductive nanometer-scaled filaments that are interconnected to form a porous network of electron-conducting paths comprising interconnected pores, wherein said filaments have a transverse dimension less than 500 nm.

8. The aluminum secondary battery of claim 7, wherein said filaments comprise an electrically conductive material selected from the group consisting of electro-spun nano fibers, vapor-grown carbon or graphite nano fibers, carbon or graphite whiskers, carbon nano-tubes, nano-scaled graphene platelets, metal nano wires, and combinations thereof.

9. The aluminum secondary battery of claim 1, wherein said exfoliated graphite or carbon is obtained by an expansion treatment and a thermal exfoliation treatment, wherein said expansion treatment increases an inter-planar spacing, $d_{002}$, from an original 0.335-0.36 nm to 0.43-1.20 nm.

10. The aluminum secondary battery of claim 9, wherein said expansion treatment includes oxidation, fluorination, bromination, chlorination, nitrogenation, intercalation, combined oxidation-intercalation, combined fluorination-intercalation, combined bromination-intercalation, combined chlorination-intercalation, or combined nitrogenation-intercalation of said graphite or carbon material.

11. The aluminum secondary battery of claim 9, wherein said thermal exfoliation comprises a constrained thermal expansion treatment to obtain an inter-flake pore size from 2 nm to 20 nm.

12. The aluminum secondary battery of claim 1, wherein said carbon or graphite material contains a non-carbon element selected from oxygen, fluorine, chlorine, bromine, iodine, nitrogen, hydrogen, or boron.

13. The aluminum secondary battery of claim 1, wherein said electrolyte is selected from an aqueous electrolyte, organic electrolyte, molten salt electrolyte, or ionic liquid electrolyte.

14. The aluminum secondary battery of claim 1, wherein said electrolyte contains $AlF_3$, $AlCl_3$, $AlBr_3$, $AlI_3$, $AlF_xCl_{(3-x)}$, $AlBr_xCl_{(3-x)}$, $AlI_xCl_{(3-x)}$, or a combination thereof, wherein x is from 0.01 to 2.0.

15. The aluminum secondary battery of claim 1, wherein said electrolyte contains an ionic liquid that contains an aluminum salt mixed with an organic chloride selected from n-butyl-pyridinium-chloride (BuPyCl), 1-methyl-3-ethyl-imidazolium-chloride (MEICl), 2-dimethyl-3-propylimidazolium-chloride, 1,4-dimethyl-1,2,4-triazolium chloride (DMTC), or a mixture thereof.

16. The aluminum secondary battery of claim 1, wherein the electrolyte also supports reversible intercalation and de-intercalation of ions at the cathode, wherein said ions include cations, anions, or both.

17. The aluminum secondary battery of claim 1, wherein said cathode active layer of carbon or graphite material operates as a cathode current collector to collect electrons during a discharge of said aluminum secondary battery and wherein said battery contains no separate or additional cathode current collector.

18. The aluminum secondary battery of claim 1, wherein said cathode active layer of carbon or graphite further comprises an electrically conductive binder material which bonds said carbon or graphite material together to form a cathode electrode layer.

19. The aluminum secondary battery of claim 18, wherein said electrically conductive binder material comprises coal tar pitch, petroleum pitch, meso-phase pitch, a conducting polymer, a polymeric carbon, or a derivative thereof.

20. The aluminum secondary battery of claim 1, wherein said battery has an average discharge voltage no less than 1.5 volt and a cathode specific capacity greater than 300 mAh/g based on a total cathode active layer weight.

21. The aluminum secondary battery of claim 1, wherein said battery has an average discharge voltage no less than 2.0 volts and a cathode specific capacity greater than 200 mAh/g based on a total cathode active layer weight.

* * * * *